(12) United States Patent
Kirkpatrick et al.

(10) Patent No.: US 9,383,906 B2
(45) Date of Patent: Jul. 5, 2016

(54) OBJECT PROCESSING DEVICE, OBJECT PROCESSING METHOD, AND OBJECT PROCESSING PROGRAM

(71) Applicant: Rakuten, Inc., Shinagawa-ku, Tokyo (JP)

(72) Inventors: Eric Kirkpatrick, Shinagawa-ku (JP); Takia Ogai, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 34 days.

(21) Appl. No.: 14/371,803

(22) PCT Filed: Jan. 24, 2013

(86) PCT No.: PCT/JP2013/051427
§ 371 (c)(1),
(2) Date: Jul. 11, 2014

(87) PCT Pub. No.: WO2014/002516
PCT Pub. Date: Jan. 3, 2014

(65) Prior Publication Data
US 2014/0375585 A1    Dec. 25, 2014

(30) Foreign Application Priority Data
Jun. 29, 2012   (JP) .................................. 2012-147134

(51) Int. Cl.
*G06F 3/0484* (2013.01)
*G06F 3/0488* (2013.01)
(Continued)

(52) U.S. Cl.
CPC ............ *G06F 3/04845* (2013.01); *G06F 3/017* (2013.01); *G06F 3/041* (2013.01); *G06F 3/0488* (2013.01); *G06F 3/04842* (2013.01); *G06F 3/04886* (2013.01); *G06F 3/167* (2013.01)

(58) Field of Classification Search
CPC ..... G06F 3/04845; G06F 3/017; G06F 3/041; G06F 3/04842; G06F 3/0488; G06F 3/04886; G06F 3/167
USPC .................................................... 345/173
See application file for complete search history.

(56) References Cited

U.S. PATENT DOCUMENTS 7,545,392 B2 *   6/2009   Sprang ............... G06F 3/04845
                                                             345/619
2009/0153478 A1 *   6/2009   Kerr ..................... H04N 5/4403
                                                             345/158

(Continued)

FOREIGN PATENT DOCUMENTS

| JP | 2004-152171 A | 5/2004 |
| JP | 2007-334785 A | 12/2007 |
| JP | 2010-122987 A | 6/2010 |

OTHER PUBLICATIONS

English Translation of International Preliminary Report on Patentability dated Jan. 8, 2015 issued in Patent Application No. PCT/JP2013/051427.

(Continued)

*Primary Examiner* — Tom Sheng
(74) *Attorney, Agent, or Firm* — Sughrue Mion, PLLC

(57) ABSTRACT

An object processing device includes a selection accepting unit that accepts selection of one or more objects among a plurality of displayed objects, a detection unit that detects instruction input for processing on objects, and an execution unit that executes processing on non-selected objects. It is thereby possible to easily set many objects as objects to be processed. Further, because processing on objects is executed by instruction input different from selection of objects, such as selection of objects displayed on a display unit, it is possible to reduce work for specified processing on objects to be processed.

17 Claims, 17 Drawing Sheets

(51) Int. Cl.
*G06F 3/041* (2006.01)
*G06F 3/16* (2006.01)
*G06F 3/01* (2006.01)

(56) References Cited

U.S. PATENT DOCUMENTS

2009/0158222 A1* 6/2009 Kerr .................. G06F 3/016
 715/867
2009/0295731 A1* 12/2009 Kim .................. G06F 1/1616
 345/168
2010/0125787 A1 5/2010 Chihara et al.
2011/0289423 A1* 11/2011 Kim .................. G06F 3/04886
 715/741
2013/0053105 A1* 2/2013 Lee .................. H04M 1/673
 455/565
2013/0083076 A1* 4/2013 Liu .................. G06F 3/0488
 345/660
2013/0215022 A1 8/2013 Chihara et al.

OTHER PUBLICATIONS

International Search Report for PCT/JP2013/051427 dated Apr. 23, 2013.

* cited by examiner (a)

(a) INTER-CATEGORY DISTANCE

| | BUSINESS | GAME | NEWS | ... |
|---|---|---|---|---|
| BUSINESS | — | 12 | 6 | ... |
| GAME | 12 | — | 8 | ... |
| NEWS | 6 | 8 | — | ... |
| ... | ... | ... | ... | ... |

(b)

| OBJECT ID | CATEGORY | A | B | C | D | E | F |
|---|---|---|---|---|---|---|---|
| A | GAME | — | ... | ... | ... | ... | ... |
| B | BUSINESS | ... | — | ... | ... | ... | ... |
| C | NEWS | ... | ... | — | ... | ... | ... |
| D | BUSINESS | 12 | 0 | 6 | — | 12 | 6 |
| E | GAME | ... | ... | ... | ... | — | ... |
| F | NEWS | ... | ... | ... | ... | ... | — |

(c)

| SHAKING TIME PERIOD | INTER-OBJECT DISTANCE OF OBJECT TO BE PROCESSED |
|---|---|
| LESS THAN 2 SECONDS | 10 OR MORE |
| 2 SECONDS TO LESS THAN 4 SECONDS | 5 OR MORE |
| 4 SECONDS OR MORE | 0 OR MORE |

OBJECT PROCESSING DEVICE, OBJECT PROCESSING METHOD, AND OBJECT PROCESSING PROGRAM

CROSS REFERENCE TO RELATED APPLICATIONS

This application is a National Stage of International Application No. PCT/JP2013/051427filed Jan. 24, 2013, claiming priority based on Japanese Patent Application No. 2012-147134, filed Jun. 29, 2012, the contents of all of which are incorporated herein by reference in their entirety.

TECHNICAL FIELD

The present invention relates to an object processing device, an object processing method, and an object processing program.

BACKGROUND ART

In the case of executing processing on some of a plurality of objects displayed on a touch panel or the like, the processing is generally executed by performing an operation for executing desired processing after selecting objects to be processed through a user interface. Further, when there are many objects to be processed and few objects not to be processed among a plurality of displayed objects, a user interface that, after selecting objects not to be processed, reverses the selected objects and non-selected objects is known (for example, see Patent Literature 1 below).

CITATION LIST

Patent Literature

PTL 1: Japanese Unexamined Patent Application Publication No. 2007-334785

SUMMARY OF INVENTION

Technical Problem

In the technique disclosed in the above-described Patent Literature 1, it is necessary to operate a selection reverse button in order to reverse the selected objects and the non-selected objects after accepting an operation to select the objects, thus requiring complicated work for the processing. In this manner, many procedural steps and complicated operations have been required to execute desired processing on many objects.

In view of the foregoing, an object of the present invention is to reduce work for executing desired processing on objects to be processed displayed on a touch panel.

Solution to Problem

To solve the above problem, an object processing device according to one aspect of the present invention is an object processing device including a display means configured to display an image containing a plurality of objects and an input means configured to be able to detect input from a user indicating a position on the display means and formed integrally with the display means, including a selection accepting means configured to accept selection of one or more objects displayed on the display means based on input by a user detected by the input means, a detection means configured to detect instruction input different from selection of objects by the selection accepting means, and an execution means configured to, when instruction input detected by the detection means in a state where selection of one or more objects is accepted by the selection accepting means is specified instruction input, execute specified processing corresponding to the specified instruction input on non-selected objects being objects for which selection is not accepted by the selection accepting means among the plurality of objects.

An object processing method according to one aspect of the present invention is an object processing method in an object processing device including a display means configured to display an image containing a plurality of objects and an input means configured to be able to detect input from a user indicating a position on the display means and formed integrally with the display means, the method including a selection accepting step of accepting selection of one or more objects based on input by a user detected by the input means, a detection step of detecting instruction input different from selection of objects in the selection accepting step, and an execution step of, when instruction input detected in the detection step in a state where selection of one or more objects is accepted in the selection accepting step is specified instruction input, executing specified processing corresponding to the specified instruction input on non-selected objects being objects for which selection is not accepted in the selection accepting step among the plurality of objects.

An object processing program according to one aspect of the present invention is an object processing program causing a computer to function as an object processing device including a display means configured to display an image containing a plurality of objects and an input means configured to be able to detect input from a user indicating a position on the display means and formed integrally with the display means, the program causing the computer to implement a selection accepting function to accept selection of one or more objects based on input by a user detected by the input means, a detection function to detect instruction input different from selection of objects by the selection accepting function, and an execution function to, when instruction input detected by the detection function in a state where selection of one or more objects is accepted by the selection accepting function is specified instruction input, execute specified processing corresponding to the specified instruction input on non-selected objects being objects for which selection is not accepted by the selection accepting function among the plurality of objects.

According to the above-described aspects, selection of one or more objects among a plurality of displayed objects is accepted, and further instruction input is detected, and thereby processing on objects that are not selected is executed. It is thereby possible to easily set many objects as objects to be processed. Further, because processing on objects is executed by instruction input different from selection of objects, such as selection of objects displayed on the display means, for example, it is possible to reduce work for executing specified processing on objects to be processed.

In an object processing device according to another aspect, the detection means can detect an event including a direction parameter with respect to a state of the object processing device, and may detect an event having a specified direction parameter as the instruction input.

According to this aspect, by causing a specified event including the concept of a direction to occur in the object processing device, instruction input for executing specified processing can be made, and therefore it is possible to easily perform processing on objects.

In an object processing device according to another aspect, the detection means can detect an event including direction and size parameters with respect to a state of the object processing device, and may detect an event having specified direction and size parameters as the instruction input.

According to this aspect, by causing a specified event including the concept of a direction and a size to occur in the object processing device, instruction input for executing specified processing can be made, and therefore it is possible to easily perform processing on objects.

In an object processing device according to another aspect, the detection means can detect a time period when a specified operation is performed on the object processing device, and may detect a specified operating time period related to the operation as the instruction input.

According to this aspect, instruction input for executing specified processing can be made by performing a specified operation on the object processing device for a specified period of time, and it is thereby possible to easily perform processing on objects.

In an object processing device according to another aspect, the detection means can detect a detected value from a gyro sensor included in the object processing device, and may detect a specified detected value as the instruction input.

According to this aspect, because a gyro sensor can be used for detection of an event including the concept of a direction, the object processing device can be easily configured.

In an object processing device according to another aspect, the detection means can detect a detected value from an acceleration sensor included in the object processing device, and may detect a specified detected value as the instruction input.

According to this aspect, because an acceleration sensor can be used for detection of an event including the concept of a direction or detection of an event including the concept of a direction and a size, the object processing device can be easily configured.

In an object processing device according to another aspect, the detection means can detect a user's voice, and may detect a specified keyword included in the voice as the instruction input.

According to this aspect, because instruction input for executing specified processing can be made by uttering a specified keyword to the object processing device, processing on objects can be easily performed. Further, because detection of a voice can be made by a device such as a microphone, for example, the object processing device can be easily configured.

In an object processing device according to another aspect, the detection means may detect specified input by a user detected by the input means as the instruction input.

According to this aspect, because instruction input for executing specified processing can be made by an input operation to the display means, processing on objects can be easily performed.

In an object processing device according to another aspect, the execution means may execute any one of processing of randomly changing positions of the non-selected objects on the display means, processing of deleting the non-selected objects, and processing of moving the non-selected objects to another page different from a page where the non-selected objects are displayed, as the specified processing. In this aspect, it is possible to execute various types of processing on non-selected objects.

In an object processing device according to another aspect, the execution means may execute first processing on the non-selected objects and executes second processing different from the first processing on selected objects being objects selected by the selection accepting means.

According to this aspect, because not only first processing is performed on non-selected objects and but also second processing is performed on selected objects in response to detection of instruction input, either one of the first and second processing can be easily performed on each of a plurality of displayed objects.

In an object processing device according to another aspect, the detection means can detect first instruction input and second instruction input different from the first instruction input as instruction input for processing on objects, and when the first instruction input is detected by the detection means, the execution means executes first processing on the non-selected objects, and when the second instruction input is detected by the detection means, the execution means may execute second processing different from the first processing on the non-selected objects.

According to this aspect, because the first and second instruction input is acceptable, and the first or second processing in accordance with the accepted instruction input is performed on non-selected objects, desired processing of the first and second processing can be easily performed on the non-selected objects.

In an object processing device according to another aspect, the detection means can detect first instruction input and second instruction input different from the first instruction input as instruction input for processing on objects, and when the first instruction input is detected by the detection means, the execution means executes first processing on the non-selected objects, and when the second instruction input is detected by the detection means, the execution means may execute second processing different from or identical to the first processing on selected objects being objects selected by the selection accepting means.

According to this aspect, because the first and second instruction input is acceptable, and the first processing on non-selected objects or the second processing on selected objects is performed in accordance with the accepted instruction input, desired processing on non-selected objects or selected objects can be easily performed.

In an object processing device according to another aspect, the detection means may detect an event including a direction parameter with respect to a state of the object processing device, detect an event having a first direction parameter as the first instruction input, and detect an event having a second direction parameter different from the first direction as the second instruction input.

According to this aspect, the first or second instruction input is detected by causing a specified event including the concept of a direction to occur in the first or second direction in the object processing device, and it is possible to perform desired processing on objects with a user interface that is easy to operate.

In an object processing device according to another aspect, the detection means can detect a time period when a specified operation is performed on the object processing device, and when the detected operating time period corresponds to a preset first time range, may detect the detected operation as the first instruction input, and when the detected operating time period corresponds to a preset second time range, detects the detected operation as the second instruction input.

According to this aspect, the first or second instruction input is detected by performing a specified operation for a time period corresponding to the first or second time range on the object processing device, and it is possible to perform desired processing on objects with a user interface that is easy to operate.

In an object processing device according to another aspect, the execution means may execute any one of processing of randomly changing positions of the objects to be processed on the display means, processing of deleting the objects to be processed, and processing of moving the objects to be processed to another page different from a page where the objects are displayed, as each of the first processing and the second processing. In this aspect, it is possible to execute various types of processing on non-selected objects or selected objects.

In an object processing device according to another aspect, an inter-object distance indicating a degree of similarity of attributes can be calculated for each pair of objects based on a relationship between attributes of each of the plurality of objects, the detection means can detect instruction input with an input value of a certain level as instruction input for processing on objects, and the execution means may execute specified processing on a non-selected object where the inter-object distance from a selected object being an object selected by the selection accepting means corresponds to an inter-object distance associated in advance with the input value accompanying the instruction input.

According to this aspect, specified processing is performed on a non-selected object having an inter-object distance from a selected object in accordance with an input value of a certain level in instruction input. It is thereby possible to control execution of processing on non-selected objects by controlling objects to be processed with a user interface that is easy to operate.

Advantageous Effects of Invention

According to one aspect of the preset invention, it is possible to reduce work for executing desired processing on objects to be processed displayed on a touch panel.

BRIEF DESCRIPTION OF DRAWINGS

FIG. 13 shows an example of a table storing an inter-category distance, a table storing a category as an attribute of an object and an inter-object distance from another object, and a table storing an input value accompanying instruction input for processing on an object and an inter-object distance of objects to be processed when the input value is acquired in association with each other.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
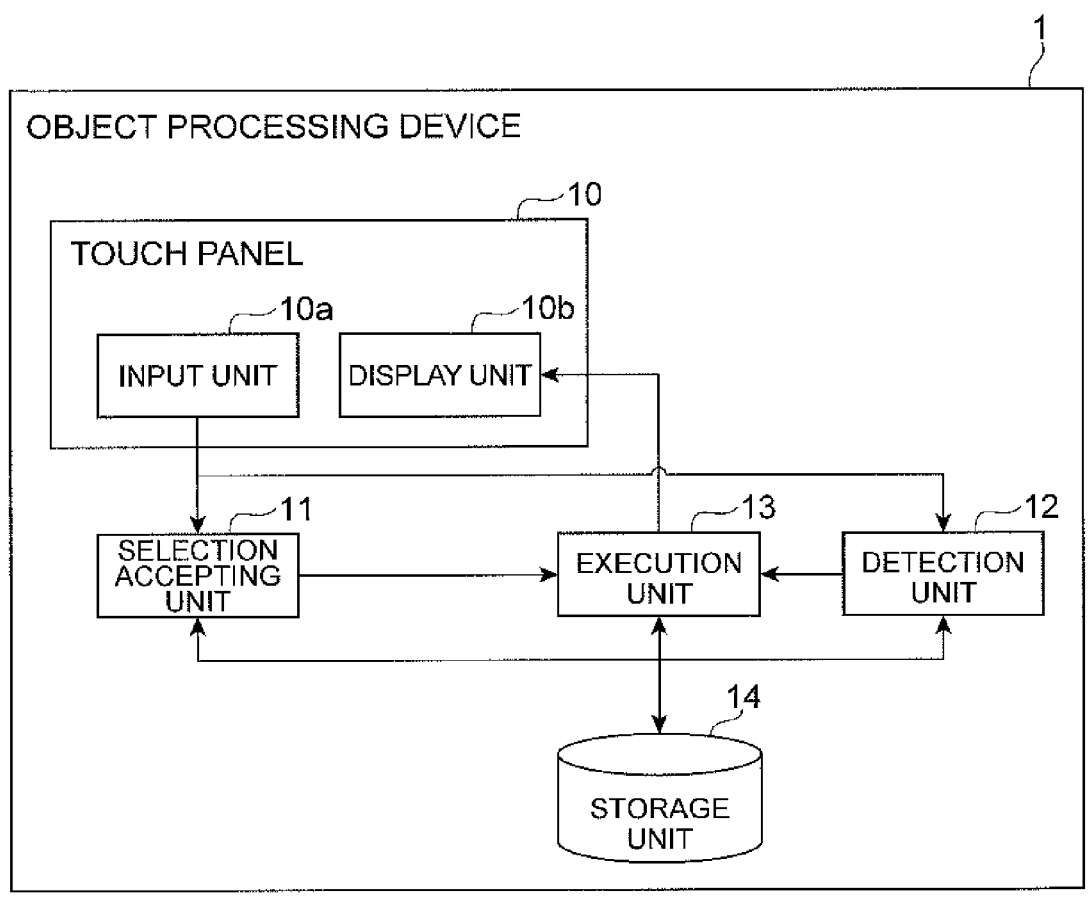
FIG. 1 is a block diagram showing a functional configuration of an object processing device.

FIG. 1 is a block diagram showing a functional configuration of an object processing device 1 according to this embodiment. The object processing device 1 is a device that includes a display means that displays an image containing a plurality of objects and an input means that can detect input from a user indicating a position on the display means and is formed integrally with the display means. The object processing device 1 is a terminal having a so-called touch panel, for example. The touch panel displays an image on a display and is provided with an input means that detects physical contact with the display and can thereby detect a position at which physical contact on the display is detected.

The object processing device 1 according to this embodiment is described hereinafter using the example of a terminal having a touch panel 10. As shown in FIG. 1, the object processing device 1 functionally includes a selection accepting unit 11 (selection accepting means), a detection unit 12 (detection means), an execution unit 13 (execution means), and a storage unit 14. The touch panel 10 includes an input unit 10a and a display unit 10b (display means). The display unit 10b is a device such as a display, for example. Further, the input unit 10a detects a position at which physical contact on the display is detected.

Figure 2:
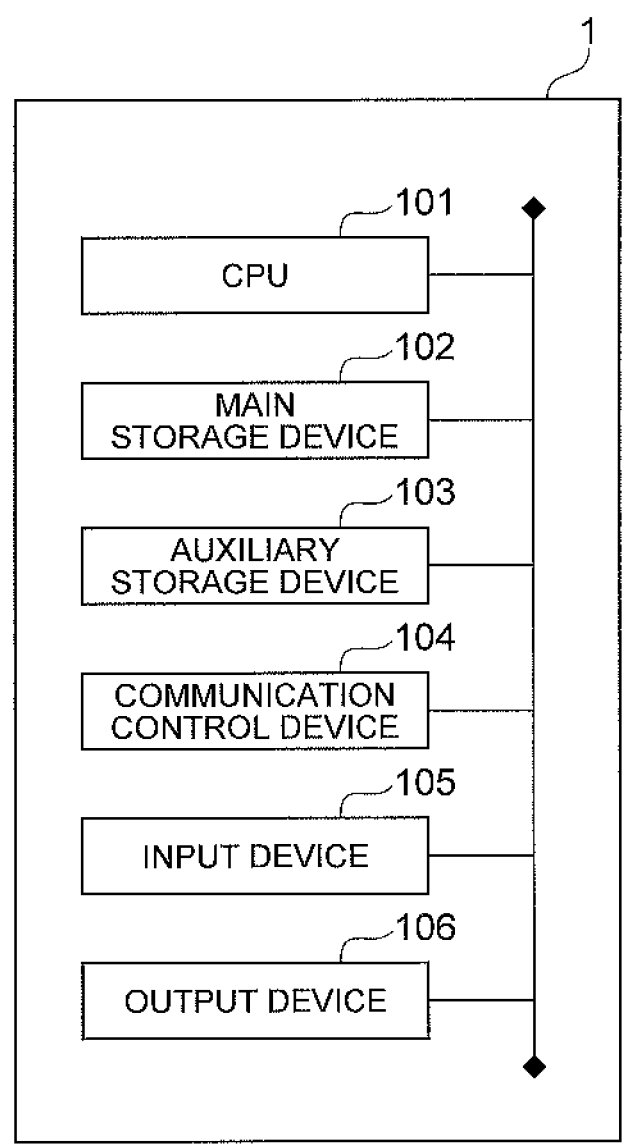
FIG. 2 is a diagram showing a hardware configuration of an object processing device.

FIG. 2 is a hardware configuration diagram of the object processing device 1. As shown in FIG. 2, the object processing device 1 is physically configured as a computer system that includes a CPU 101, a main storage device 102 such as memory like RAM and ROM, an auxiliary storage device 103 such as a hard disk, a communication control device 104 such as a network card, an input device 105 such as a keyboard and a mouse, an output device 106 such as a display and the like.

The functions shown in FIG. 1 are implemented by loading given computer software (object processing program) onto hardware such as the CPU 101 or the main storage device 102 shown in FIG. 2, making the communication control device 104, the input device 105 and the output device 106 operate under control of the CPU 101, and performing reading and writing of data in the main storage device 102 or the auxiliary storage device 103. Data and database required for the processing is stored in the main storage device 102 or the auxiliary storage device 103.

In this embodiment, objects to be processed are icons representing files, applications and the like, a set of text, text boxes and the like, for example. The objects have a variety of attribute information in accordance with their types, and those attribute information is stored in association with the objects in the storage unit 14. The attribute information of the objects includes information about an application indicated by the object being an icon, the contents of text of an object being a text box and the like, for example.

Figure 3:
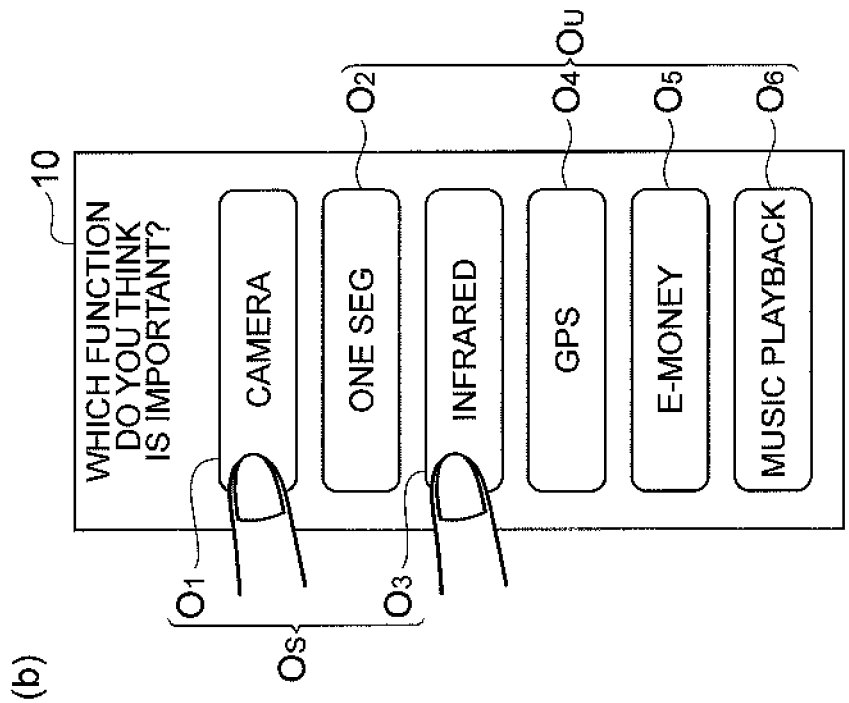
FIG. 3 is a diagram showing an example of acceptance of selection of objects.
Figure 3:
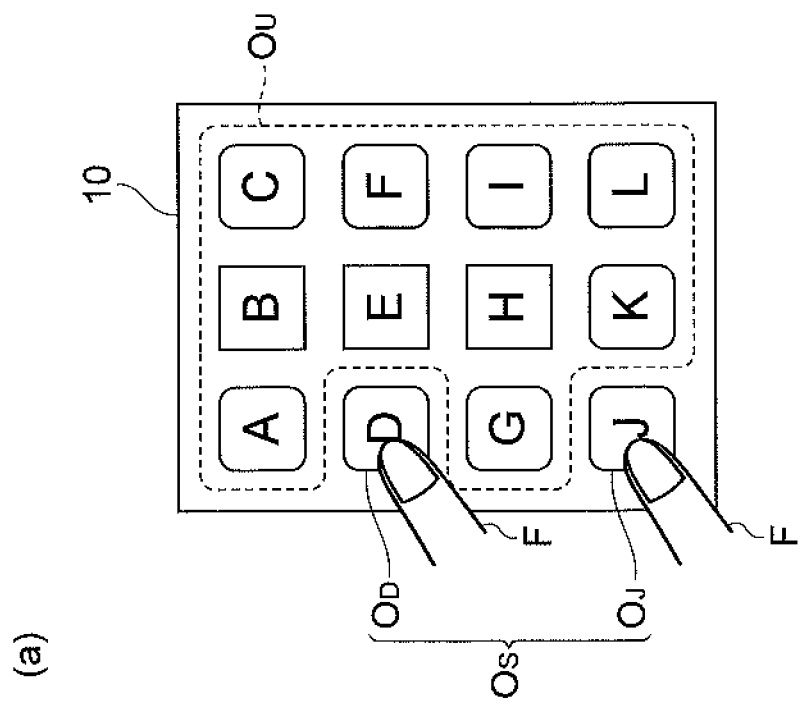

The selection accepting unit 11 is a part that accepts selection of one or more objects among a plurality of objects displayed on the display unit 10b. The accepting of selection of objects is described hereinafter with reference to FIG. 3. In the example shown in FIG. 3(a), twelve objects being icons are displayed on the touch panel 10 of the information processing device 1.

When physical contact on objects $O_D$ and $O_J$ by a finger F is detected by the input unit 10a, the selection accepting unit 11 accepts selection of the objects $O_D$ and $O_J$. To be specific, the display position and the display area of each of the objects O are stored for each object in the storage unit 14, for example, and therefore the selection accepting unit 11 can accept selection of the objects by acquiring the position information indicating the position of the physical contact by the finger F that is detected by the input unit 10a and determining whether the acquired position information corresponds to the display area of any of the objects. The selected objects $O_D$ and $O_J$ are recognized as selected objects $O_S$ in the object processing device 1. On the other hand, objects O that are not selected among a plurality of objects displayed on the display unit 10b are recognized as non-selected objects $O_U$ in the object processing device 1.

In the example shown in FIG. 3(b), six objects $O_1$ to $O_6$ being text boxes are displayed on the touch panel 10 of the information processing device 1. When physical contact on objects $O_1$ and $O_3$ by a finger F is detected by the input unit 10a, the selection accepting unit 11 accepts selection of the objects $O_1$ and $O_3$. The selected objects $O_1$ and $O_3$ are recognized as selected objects $O_S$ in the object processing device 1. On the other hand, objects $O_2$, $O_4$, $O_5$ and $O_6$ that are not selected are recognized as non-selected objects $O_U$ in the object processing device 1.

The detection unit 12 is a part that detects instruction input different from selection of objects by the selection accepting unit 11. Specifically, because the selection accepting unit 11 accepts selection of objects by way of detecting physical contact with objects displayed on the display unit 10b of the touch panel 10, the detection unit 12 detects instruction input for processing on objects based on an operation different from selection of objects by physical contact with the touch panel 10. The detection of instruction input is described hereinafter with reference to FIGS. 4 and 5.

Figure 4:
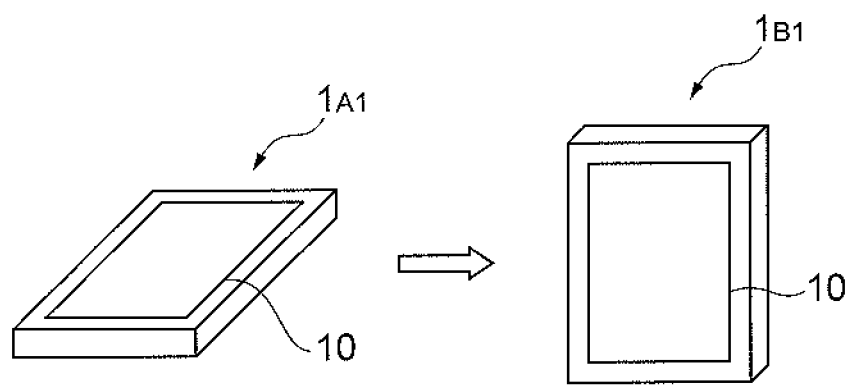
FIG. 4 is a diagram showing an example of detection of instruction input by a detection unit.

FIG. 4 is a diagram showing an example of detection of instruction input by the detection unit 12. The detection unit 12 can detect an event including the concept of the direction with respect to the state of the object processing device 1, and it can detect detection of an event having a specified direction as instruction input. In other words, the detection unit 12 can detect an event that includes a direction as a parameter. In the example shown in FIG. 4, the object processing device 1 includes a gyro sensor, for example, as an element for detecting an event including a direction parameter. In the case where it is set as an event having a specified direction with respect to the state of the object processing device 1 that a screen as the display unit 10b of the touch panel 10 is held in the state along a substantially perpendicular direction, when a user operates the object processing device 1 from the state indicated by the symbol $1_{A1}$ to the state indicated by the symbol $1_{B1}$ as shown in FIG. 4, the detection unit 12 detects the operation as instruction input for processing on objects. Because instruction input is detected in this manner, it is possible to easily perform processing on objects without placing a special graphical user interface on the screen of the display unit 10b. Although a gyro sensor is used as an example of an element for detecting an event including a direction parameter in the example shown in FIG. 4, the object processing device 1 may include another element that can detect an event including a direction parameter, and an acceleration sensor that can detect the acceleration of gravity, an electromagnetic compass that can detect the earth's magnetism and the like may be included, for example. In the case where the object processing device 1 includes an electromagnetic compass, the detection unit 12 can detect in which direction a specified direction in the object processing device 1 faces, and the detected direction may be treated as an event having a specified direction in this embodiment.

Figure 5:
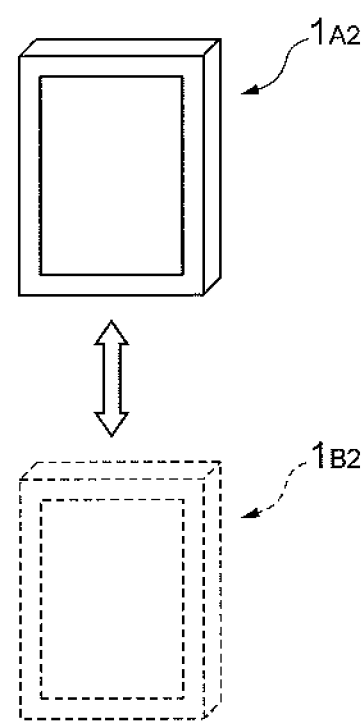
FIG. 5 is a diagram showing another example of detection of instruction input by a detection unit.

FIG. 5 is a diagram showing another example of detection of instruction input by the detection unit 12. The detection unit 12 can detect an event including a direction and a size with respect to the state of the object processing device 1 as parameters, and it can detect detection of an event having a specified direction and size as instruction input. In other words, the detection unit 12 can detect an event that includes a direction and a size as parameters. In the example shown in FIG. 5, the object processing device 1 includes an acceleration sensor, for example, as an element for detecting an event including direction and size parameters. In the case where acceleration detected when shaking the object processing device 1 in the longitudinal direction of the object processing device 1 is set as a specified event, when a user operates the object processing device 1 to shake it between the state indicated by the symbol $1_{A2}$ and the state indicated by the symbol $1_{A2}$ as shown in FIG. 5, the detection unit 12 detects the operation as instruction input for processing on objects. Because instruction input is detected in this manner, it is possible to easily perform processing on objects without placing a special graphical user interface on the screen of the display unit 10b. Note that an operation that shakes the object processing device 1 being held facing a specified direction may be set as a specified event for detecting instruction input by the detection unit 12. Although an acceleration sensor is used as an example of an element for detecting an event including direction and size parameters in the example shown in FIG. 5, the object processing device 1 may include another element that can detect an event including direction and size parameters.

Further, the detection unit 12 can detect a time period during which a specified operation is performed on the object processing device 1, and it may acquire detection of a specified operating time period related to the operation as instruction input. For example, the detection unit 12 may detect that an operation of shaking the object processing device 1 in a specified direction as described above with reference to FIG. 5 is continuously performed for a specified time period as instruction input for processing on objects.

Further, in the case where the object processing device 1 includes a microphone that can detect a user's voice, the detection unit 12 may detect detection of a specified keyword from the acquired user's voice as instruction input for processing on objects. Note that information about a specified event for the detection unit 12 to detect instruction input may be set in advance in the storage unit 14, for example.

Further, the detection unit 12 may detect specified input by a user detected by the input unit 10a as instruction input. To be specific, when physical contact with a region other than the region where objects are displayed on the touch panel 10 is detected by the input unit 10a in the state where acceptance of selection of objects by the selection accepting unit 11 is maintained, the detection unit 12 may detect the detection event as instruction input. Accordingly, specified processing can be executed when a user makes tapping on the touch panel using the fifth finger while making selection of objects using the first to fourth fingers, for example.

Figure 6:
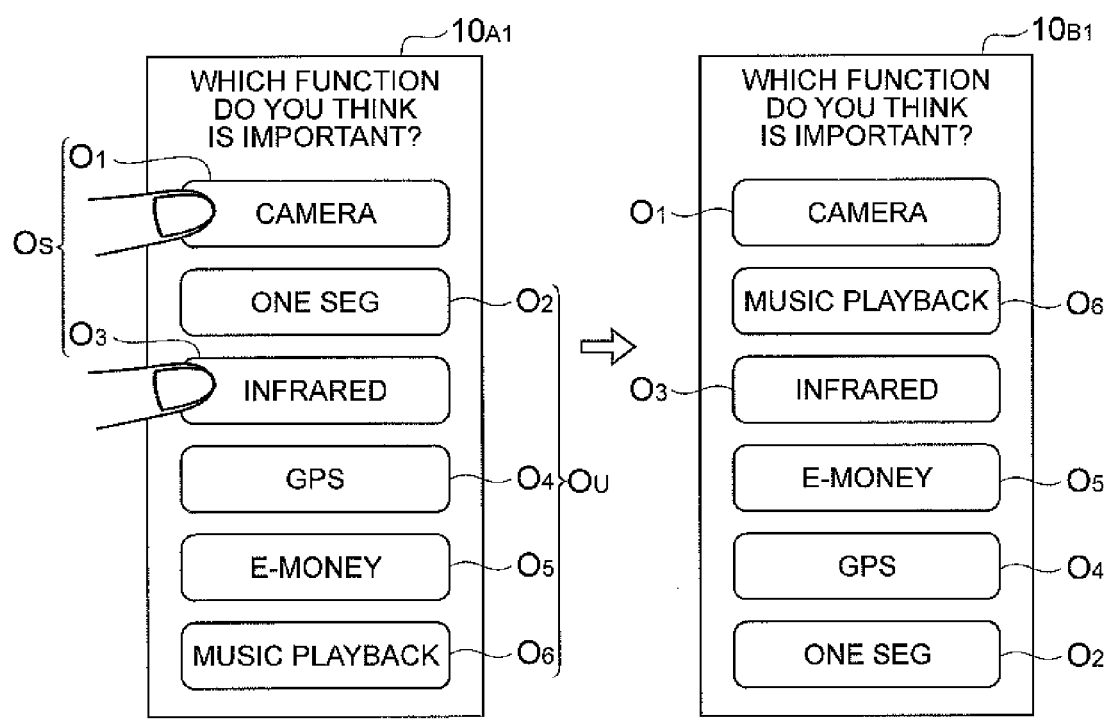
FIG. 6 is a diagram showing an example of processing where the positions of non-selected objects are randomly changed.
Figure 7:
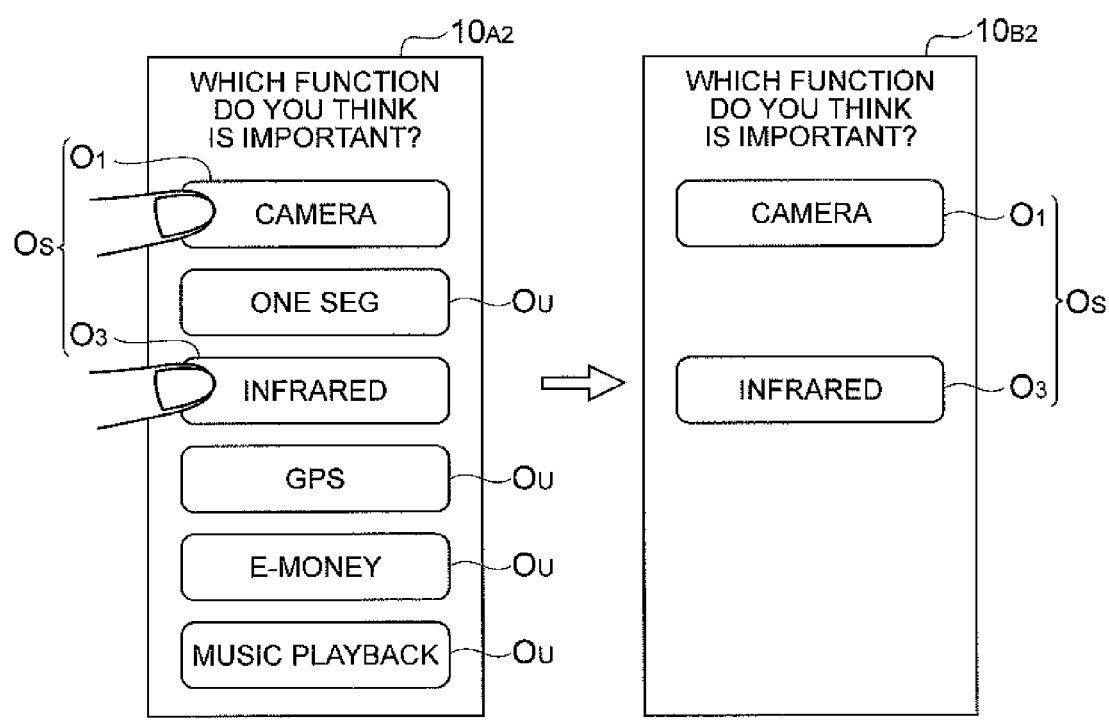
FIG. 7 is a diagram showing an example of processing where non-selected objects are deleted.

The functional units of the object processing device 1 are described with reference back to FIG. 1. The execution unit 13 is a part that, when instruction input detected by the detection unit 12 in the state where selection of one or more objects is accepted by the selection accepting unit 11 is specified instruction input, executes specified processing corresponding to the specified instruction input on non-selected objects being objects for which selection is not accepted by the selection accepting unit 11 among a plurality of objects. Specific examples of specified processing by the execution unit 13 are described with reference to FIGS. 6 to 8. FIGS. 6 and 7 are diagrams showing examples of processing to set answer choices for a question in an application to create a questionnaire. Note that FIGS. 9, 11 and 12 referred to later are also diagrams showing examples of processing to set answer choices for a question in an application to create a questionnaire.

The execution unit 13 performs processing of changing the positions of non-selected objects on the display unit 10b at random as specified processing. FIG. 6 is a diagram showing an example of processing where the positions of non-selected objects are randomly changed. As shown in FIG. 6, when selection of objects $O_1$ and $O_3$ is accepted among a plurality of objects displayed on a touch panel $10_{A1}$ before executing processing, the objects $O_1$ and $O_3$ are recognized as selected objects $O_S$ and the objects $O_2$, $O_4$, $O_5$ and $O_6$ are recognized as non-selected objects $O_U$. Then, when specified instruction input is detected by the detection unit 12 in the state where selection of the objects $O_1$ and $O_3$ is accepted by the selection accepting unit 11, the execution unit 13 randomly changes the positions of the objects $O_2$, $O_4$, $O_5$ and $O_6$, which are the non-selected objects $O_U$, on the touch panel $10_{B1}$ after executing the processing as specified processing in accordance with the detected specified instruction input.

Further, the execution unit 13 may perform processing of deleting non-selected objects as specified processing. FIG. 7 is a diagram showing an example of processing where non-selected objects are deleted. As shown in FIG. 7, when, among a plurality of objects displayed on a touch panel $10_{A2}$ before executing processing, selection of objects $O_1$ and $O_3$ is accepted, the objects $O_1$ and $O_3$ are recognized as selected objects $O_S$ and the objects that are not selected are recognized as non-selected objects $O_U$. Then, when specified instruction input is detected by the detection unit 12 in the state where selection of the objects $O_1$ and $O_3$ is accepted by the selection accepting unit 11, the execution unit 13 deletes the non-selected objects $O_U$ and lefts display of the objects $O_1$ and $O_3$ being the selected objects $O_S$ only on a touch panel $10_{B2}$ after executing the processing as specified processing in accordance with the detected specified instruction input.

Figure 8:
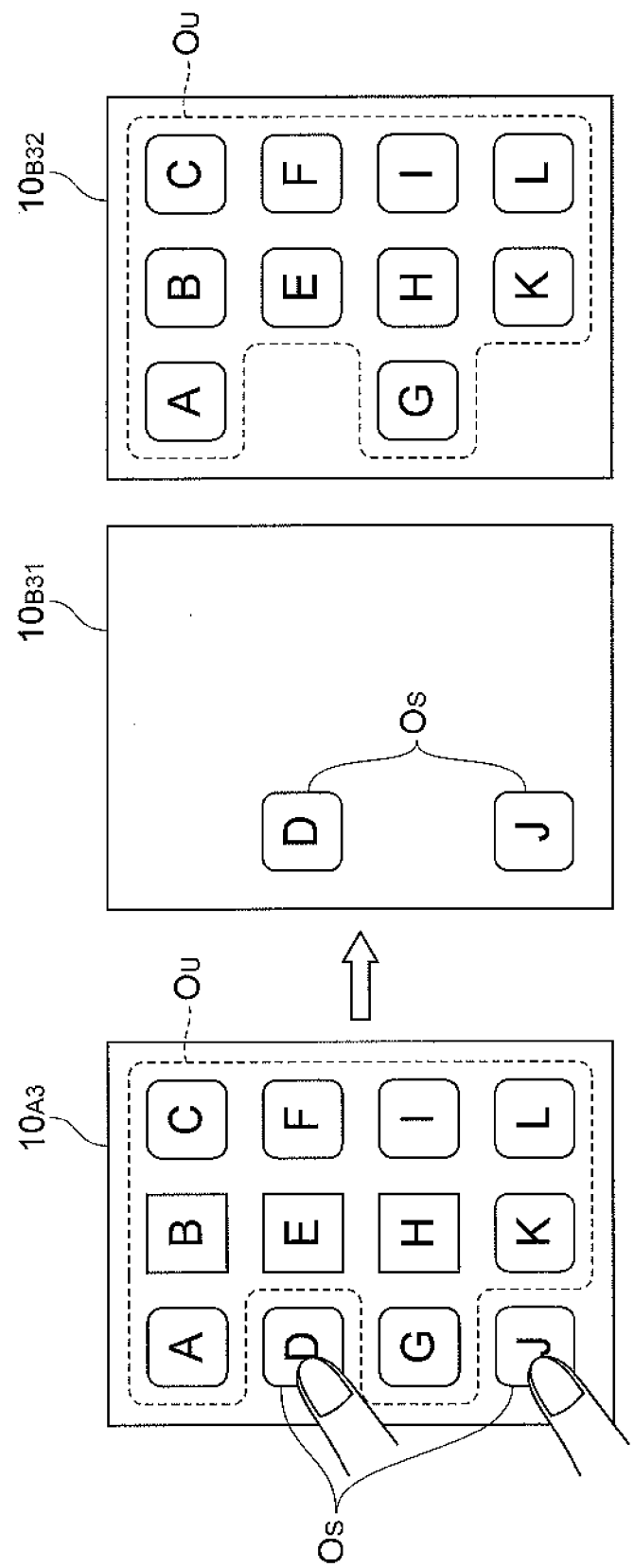
FIG. 8 is a diagram showing an example of processing where non-selected objects are moved to another page.

Further, the execution unit 13 may perform processing of moving non-selected objects to another page different from the page on which the non-selected objects are displayed. FIG. 8 is a diagram showing an example of processing where non-selected objects are moved to another page. As shown in FIG. 8, when selection of objects is accepted among a plurality of objects displayed on a touch panel $10_{A3}$ before executing processing, the selected objects are recognized as selected objects $O_S$ and the objects that are not selected are recognized as non-selected objects O. Then, when specified instruction input is detected by the detection unit 12 in the state where selection of the selected objects $O_S$ is accepted by the selection accepting unit 11, the execution unit 13 moves the non-selected objects $O_U$ from an original page $10_{B31}$ to another page $10_{B32}$ and leaves only display of the objects $O_1$ and $O_3$ being the selected objects $O_S$ in the original page $10_{B31}$ on display of the touch panel after executing processing. Accordingly, by executing processing after selecting objects having similar attributes, for example, the non-selected objects are moved to another page, and it is thus possible to gather the objects having similar attributes in one page, which facilitates the arrangement of objects.

Although performing an operation for instruction input by a user touching objects displayed on the screen of the display unit 10b with the finger is assumed as a way of implementing object processing according to this embodiment by a user, even when the position of the finger touching the selected objects has moved during performing an operation for instruction input, the selected objects may be controlled not to be changed. By such control, instruction input by a user can be easy. Further, in the case where, after a user performs an operation for instruction input by touching objects displayed on the screen of the display unit 10b with the finger and then specified processing by the execution unit 13 is executed, the user has moved the position of the finger touching the screen for a specified distance and then lifts the finger off the screen, so-called undo processing that returns the processing executed by the execution unit 13 to its original state may be controlled to be done.

Figure 9:
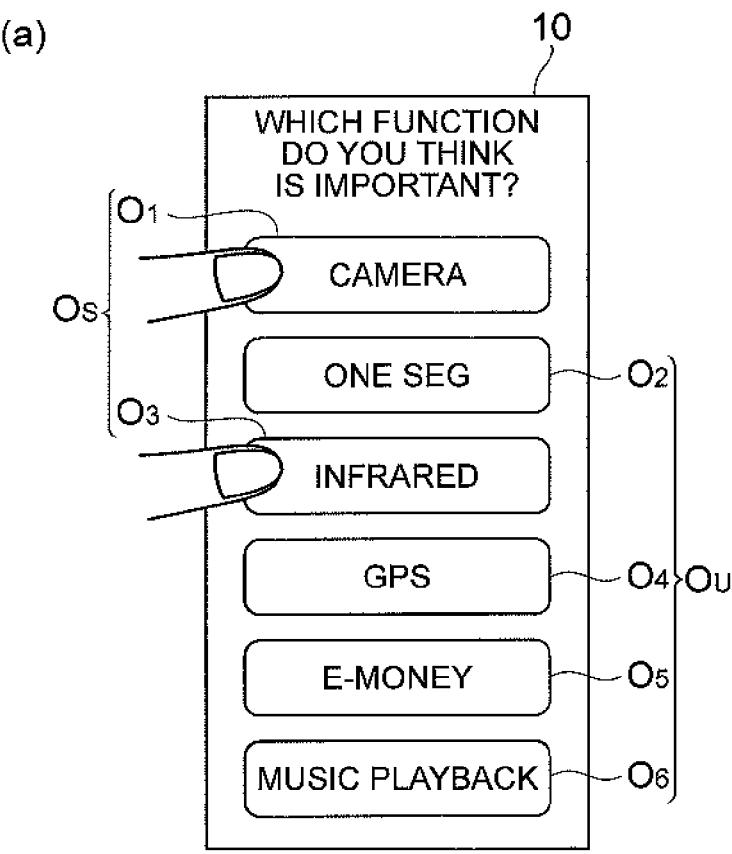
FIG. 9 is a diagram showing an example of processing on non-selected objects and selected objects.

Further, the execution unit 13 may execute processing not only on non-selected objects but also on selected objects in accordance with instruction input for processing on objects. Specifically, when instruction input is detected, the execution unit 13 may execute first processing on non-selected objects and further execute second processing different from the first processing on selected objects. FIG. 9 is a diagram showing an example of processing on non-selected objects and selected objects. As shown in FIG. 9(a), when selection of objects $O_1$ and $O_3$ among a plurality of objects displayed on the touch panel 10 is accepted, the objects $O_1$ and $O_3$ are recognized as selected objects $O_S$, and the objects $O_2$, $O_4$, $O_5$ and $O_6$ are recognized as non-selected objects O. Then, when specified instruction input is detected by the detection unit 12 in the state where selection of the selected objects $O_S$ is accepted by the selection accepting unit 11, the execution unit 13 assigns a display attribute "random" to the objects $O_2$, $O_4$, $O_5$ and $O_6$, which are the non-selected objects $O_U$, and assigns a display attribute "fixed" to the selected objects $O_1$ and $O_3$, which are the selected objects $O_S$ in the table storing the display attributes of the objects as shown in FIG. 9(b). Then, the execution unit 13 can execute processing of re-displaying objects according to the display attribute assigned in this manner. Because processing on non-selected objects and selected objects is executed in accordance with instruction input detected by the detection unit 12, it is possible to easily perform processing on objects without placing a special graphical user interface on the screen of the display unit 10b.

The table shown in FIG. 9(b) is stored in the storage unit 14, for example. Display of objects after re-display processing is the same as display of objects on the touch panel $10_{B1}$ shown in FIG. 6. Although an example in which the execution unit 13 executes first processing that assigns the display attribute "random" to the non-selected objects $O_U$, and executes second processing that assigns the display attribute "fixed" to the selected objects $O_S$ is illustrated in FIG. 9, any kind of first and second processing may be executed on each of the non-selected objects $O_U$ and the selected objects $O_S$.

Although the case where the detection unit 12 detects instruction input for processing on objects is described above, the detection unit 12 may detect first instruction input and second instruction input different from the instruction input as instruction input for processing on objects. Specifically, the detection unit 12 can detect two types of events that can be detected and distinguished in the object processing device 1 as the first and second instruction input. The first and second instruction input a specifically described below.

Figure 10:
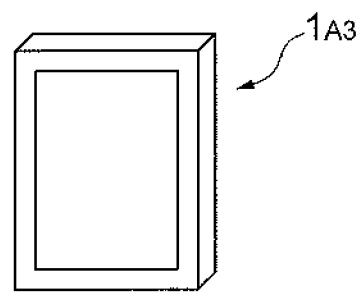
FIG. 10 is a diagram showing an example of detection of first and second instruction input by a detection unit.
Figure 10:
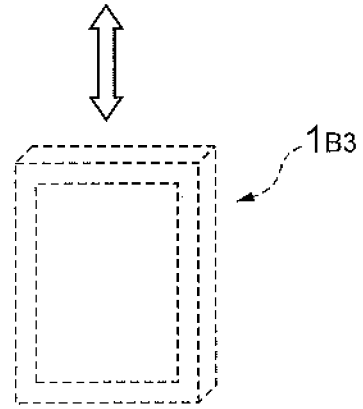
Figure 10:
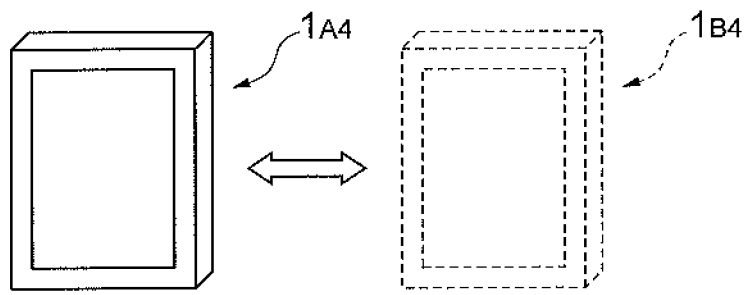

The detection unit 12 detects an event that includes a direction parameter with respect to the state of the object processing device 1 and, when it detects an event having a first direction parameter, accepts the detected event as first instruction input, and when it detects an event having a second direction parameter, accepts the detected event as second instruction input. FIG. 10 is a diagram showing an example of detection of first and second instruction input by the detection unit 12.

As shown in FIG. 10(a), when an event that the object processing device 1 moves up and down between the state indicated by the symbol $1_{A3}$ and the state indicated by the symbol $1_{B3}$ along a substantially perpendicular direction as a result that a user performs an operation of shaking the object processing device 1, the detection unit 12 detects the event as first instruction input for processing on objects. In other words, the detection unit 12 detects detection of the event of reciprocation along the first direction having the substantially perpendicular direction as a first direction parameter as first instruction input. Such an event can be acquired by an acceleration sensor, for example.

On the other hand, as shown in FIG. 10(b), when an event that the object processing device 1 moves back and forth between the state indicated by the symbol $1_{A4}$ and the state indicated by the symbol $1_{B4}$ along a substantially horizontal direction as a result that a user performs an operation of shaking the object processing device 1, the detection unit 12 detects the event as second instruction input for processing on objects. In other words, the detection unit 12 detects detection of the event of reciprocation along the second direction having the substantially horizontal direction as a second direction parameter as second instruction input. In this manner, by causing the event including the first or second direction parameter to occur in the object processing device 1, the first or second instruction input is detected, and therefore it is possible to perform desired processing on objects with an interface that is easy to operate, without placing a special graphical user interface on the screen of the display unit 10b.

Note that the detection unit 12 may accept an operation that shakes the object processing device 1 being held in a given first direction in a specified direction as first instruction input and detect an operation that shakes the object processing device 1 being held in a given second direction in a specified direction as second instruction input.

Further, the detection unit 12 can detect a time period when a specified operation is performed on the object processing device 1, and it may accept a detected operation as first instruction input when the detected time period corresponds to a preset first time range, and detect a detected operation as second instruction input when the time period corresponds to a preset second time range.

For example, the detection unit 12 can detect an operation that the object processing device 1 is shaken by a user with an acceleration sensor, for example, and further acquire an operating time period during which the operation is performed continuously and, when the acquired operating time period corresponds to a preset first time range, accept the detected operation as first instruction input and, when the acquired operating time period corresponds to a preset second time range, accept the detected operation as second instruction input. In this manner, first or second instruction input is detected by continuing an operation for a specified period of time on the object processing device 1, and therefore it is possible to perform desired processing on objects with an interface that is easy to operate, without placing a special graphical user interface on the screen of the display unit 10b. Note that an operation to be detected in this case may be any operation as long as the state of the operation and the time period of the operation are detectable.

Figure 11:
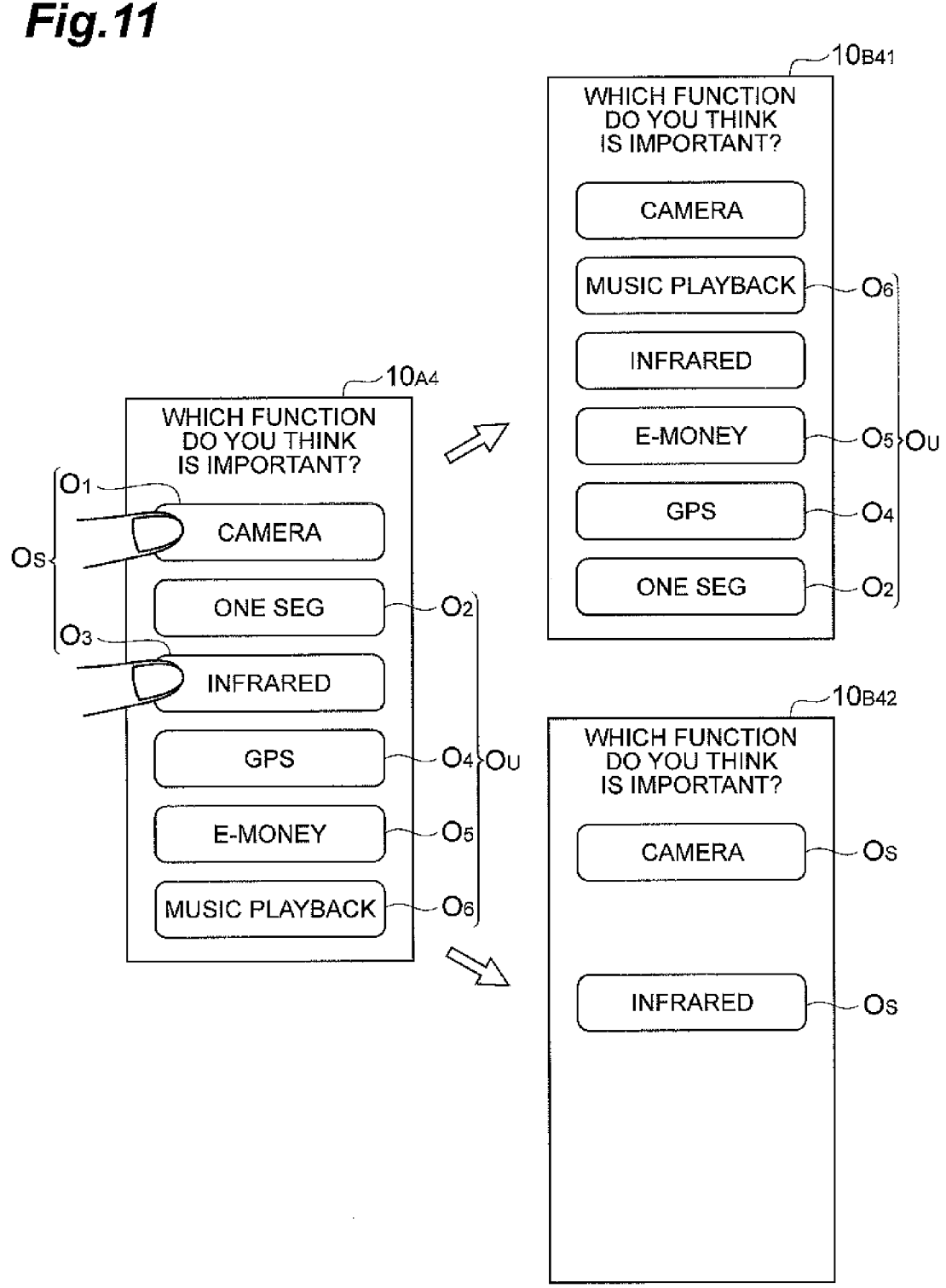
FIG. 11 is a diagram showing an example of processing executed in response to detection of first and second instruction input.

Hereinafter, execution of processing by the execution unit 13 in the case where the first and second instruction input is acceptable in the detection unit 12 is described hereinbelow. When the first instruction input is accepted by the detection unit 12, the execution unit 13 executes first processing on non-selected objects, and when the second instruction input is accepted by the detection unit 12, the execution unit 13 executes second processing different from the first processing on non-selected objects. FIG. 11 is a diagram showing an example of processing executed in response to detection of the first and second instruction input.

As shown in FIG. 11, when selection of objects $O_1$ and $O_3$ is accepted among a plurality of objects displayed on a touch panel $10_{A4}$ before executing processing, the objects $O_1$ and $O_3$ are recognized as selected objects $O_S$ and the objects $O_2$, $O_4$, $O_5$ and $O_6$ are recognized as non-selected objects $O_U$. Then, when first instruction input is detected by the detection unit 12 in the state where selection of the selected objects $O_S$ is accepted by the selection accepting unit 11, the execution unit 13 randomly changes the positions of the objects $O_2$, $O_4$, $O_5$ and $O_6$, which are the non-selected objects $O_U$, on the touch panel $10_{B41}$ after executing the processing. On the other hand, when second instruction input is detected by the detection unit 12 in the state where selection of the selected objects $O_S$ is accepted, the execution unit 13 deletes the non-selected objects $O_U$ and leaves display of the objects $O_1$ and $O_3$, which are the selected objects $O_S$, only on the touch panel $10_{B42}$ after executing the processing. In this manner, because the first or second processing is performed on non-selected objects in accordance with the first or second instruction input, it is possible to easily perform desired one of the first and second processing on non-selected objects.

Figure 12:
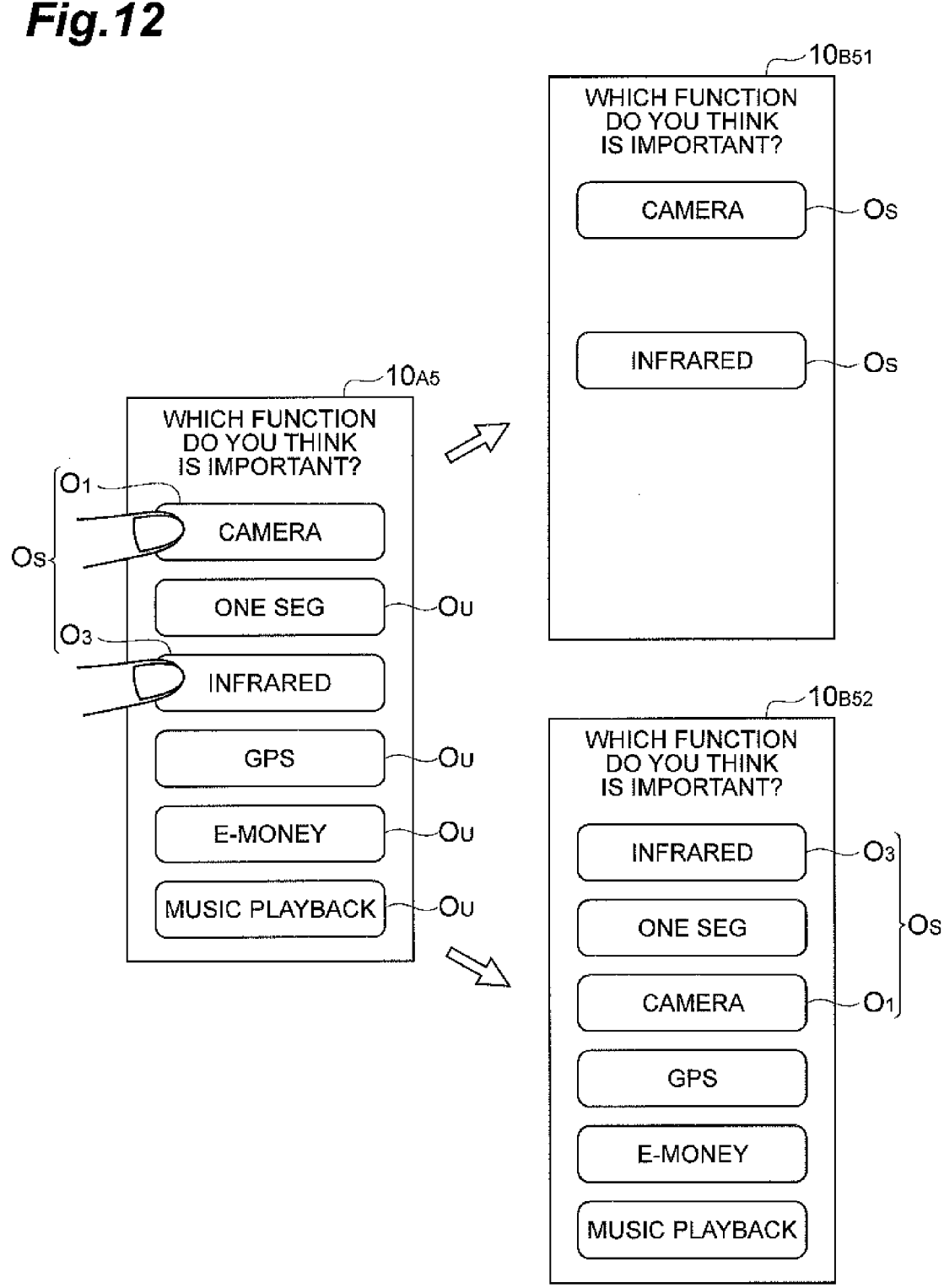
FIG. 12 is a diagram showing an example of processing executed in response to detection of first and second instruction input.

Further, when the first instruction input is accepted by the detection unit 12, the execution unit 13 may execute first processing on non-selected objects, and when the second instruction input is accepted by the detection unit 12, the execution unit 13 may execute second processing different from the first processing on selected objects. FIG. 12 is a diagram showing an example of processing executed in response to detection of the first and second instruction input.

As shown in FIG. 12, when selection of objects $O_1$ and $O_3$ is accepted among a plurality of objects displayed on a touch panel $10_{A5}$ before executing processing, the objects $O_1$ and $O_3$ are recognized as selected objects $O_S$ and the objects that are not selected are recognized as non-selected objects O. Then, when first instruction input is detected by the detection unit 12 in the state where selection of the selected objects $O_S$ is accepted by the selection accepting unit 11, the execution unit 13 deletes the non-selected objects $O_U$ and leaves display of the selected objects $O_S$ only on the touch panel $10_{B51}$ after executing the processing. On the other hand, when second instruction input is detected by the detection unit 12 in the state where selection of the selected objects $O_S$ is accepted by the selection accepting unit 11, the execution unit 13 randomly changes the positions of the objects $O_1$ and $O_3$, which are the selected objects $O_S$, on the touch panel $10_{B52}$ after executing the processing. In this manner, because the first processing on non-selected objects or the second processing on selected objects is performed in accordance with the first or second instruction input, it is possible to easily perform desired processing on non-selected objects or selected objects. Although processing performed on selected objects in response to the second instruction input is different from processing performed on non-selected objects in response to the first instruction input, the processing may be the same.

Although random change of the positions of objects, deletion of objects and the like are illustrated as examples of the first and second processing in FIGS. 11 and 12, the processing on objects may be any processing, and processing that moves objects to be processed to another page may be performed, for example.

Other examples of processing of detecting instruction input by the detection unit 12 and processing executed on objects by the execution unit 13 are described hereinafter with reference to FIGS. 13 and 14.

In this example, an inter-object distance indicating the degree of similarity between the attributes of a plurality of objects can be calculated for each pair of objects based on the relationship between the attributes. Further, the detection unit 12 can detect instruction input with an input value indicating a certain level as instruction input for processing on objects. Then, the execution unit 13 executes specified processing on a non-selected object whose inter-object distance from a selected object corresponds to the inter-object distance associated in advance with the input value accompanying the instruction input. A specific example is described below.

FIG. 13($a$) is a diagram showing an example of a table that stores an inter-category distance indicating the degree of similarity between categories as attributes of objects. To be specific, as the inter-category distance is smaller, the degree of similarity between categories is larger. In the example shown in FIG. 13($a$), because the degree of similarity between "business" and "game" is relatively small, "12" is stored as the inter-category distance for them, and because the degree of similarity between "business" and "news" is relatively large, "6" is stored as the inter-category distance for them.

FIG. 13($b$) is a diagram showing an example of a table that stores a category as an attribute of an object and an inter-object distance from another object for each object ID that identifies an object. The inter-object distance is a value calculated based on the degree of similarity between attributes of objects, and it can be calculated based on the inter-category distance that is stored in the table shown in FIG. 13($a$), for example. In the example shown in FIG. 13($b$), an object $O_D$ with the object ID "D" has the category "business" as its attribute. Further, the inter-object distance from the object $O_D$ to an object $O_A$ with the object ID "A" is "12", for example.

FIG. 13($c$) is a diagram showing an example of a table that stores an input value accompanying instruction input for processing on objects and an inter-object distance of objects to be processed when the input value is acquired in association with each other. It is assumed that the detection unit 12 detects an event where an operation of shaking the object processing device 1 by a user is detected by an acceleration sensor or the like is detected as instruction input, and a shaking time period, which is a time period during which detection of the operation of shaking the object processing device 1 by the user continues, is acquired as an input value accompanying instruction input. In the setting example of the table shown in FIG. 13($c$), when the shaking time period is "less than 2 seconds", a non-selected object whose inter-object distance from a selected object is "10 or more" is to be processed.

Note that the tables shown in FIGS. 13($a$) to 13($c$) may be stored in the storage unit 14 that is set in advance, for example. Further, the inter-object distance in the table of FIG. 13($b$) may be calculated by the execution unit 13.

A specific example of processing on non-selected objects based on the inter-object distance is described hereinafter with reference to FIG. 14. It is assumed in this embodiment that specified processing on non-selected objects is processing of deleting the objects.

Figure 14:
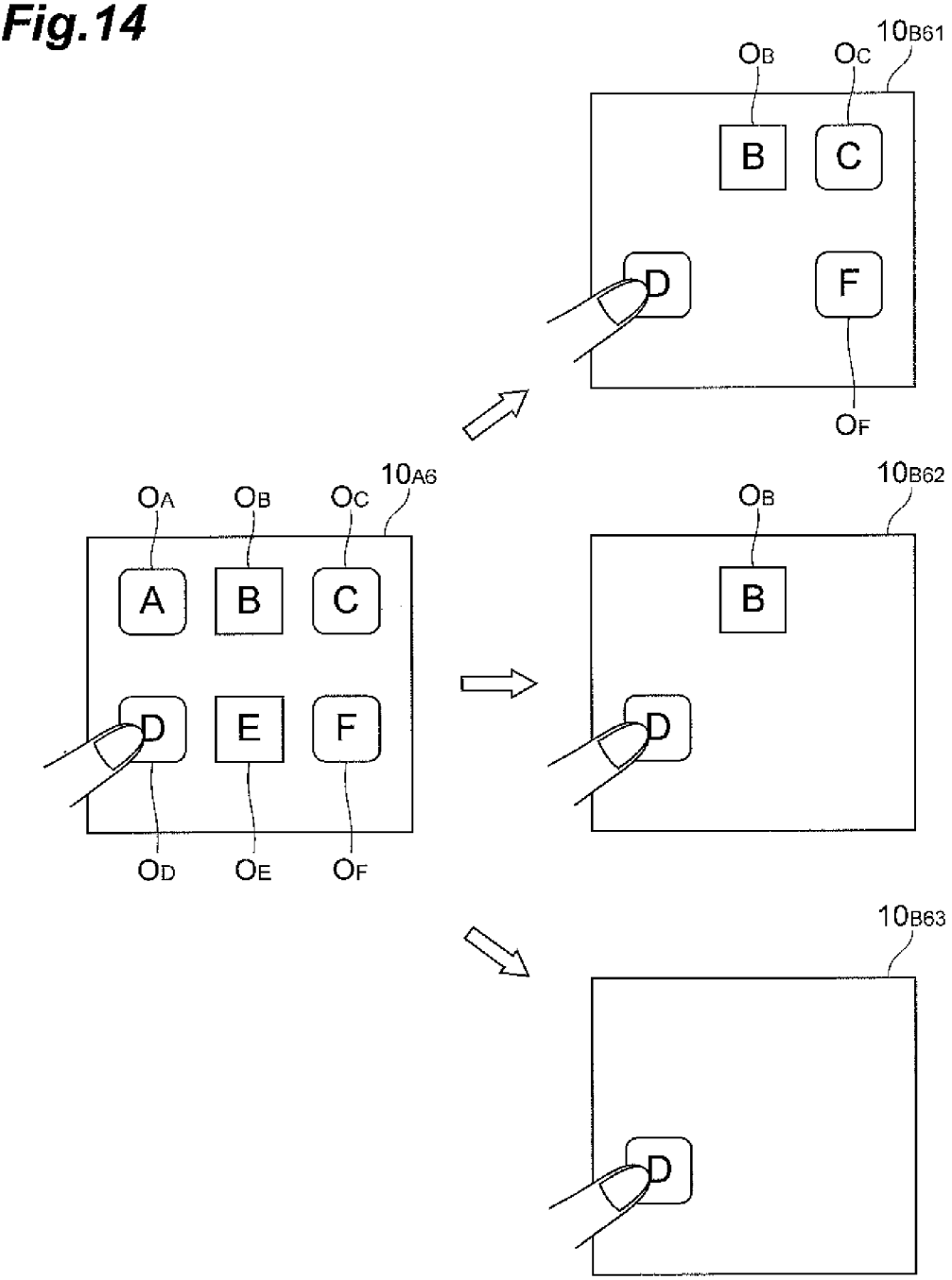
FIG. 14 is a diagram showing a specific example of processing on non-selected objects based on a distance between objects.

As shown in FIG. 14, when selection of an object $O_D$ among a plurality of objects $O_A$ to $O_F$ displayed on the touch panel $10_{A6}$ before executing processing is accepted, the object $O_D$ is recognized as a selected object, and the objects $O_A$ to $O_C$, $O_E$ and $O_F$ are recognized as non-selected objects. Then, when instruction input based on a user's operation of shaking the object processing device 1 with the shaking time period of less than 2 seconds is detected by the detection unit 12 in the state where selection of the object $O_D$ is accepted, the execution unit executes processing of deleting non-selected objects whose inter-object distance from the object $O_D$, which is the selected object, is 10 or more (see FIG. 13($c$)). Specifically, the execution unit 13 refers to the table of FIG. 13($b$) and recognizes the objects $O_A$ and $O_E$ whose inter-object distance from the object $O_D$ is 10 or more and then deletes the objects $O_A$ and $O_E$ as shown in the touch panel $10_{B61}$ after executing processing.

Further, when instruction input based on a user's operation of shaking the object processing device 1 with the shaking time period of 2 seconds to less than 4 seconds is detected by the detection unit 12, the execution unit 13 executes processing of deleting non-selected objects whose inter-object distance from the object $O_D$ is 5 or more (see FIG. 13($c$)). Specifically, the execution unit 13 refers to the table of FIG. 13($b$) and recognizes the objects $O_A$, $O_C$, $O_E$ and $O_F$ whose inter-object distance from the object $O_D$ is 5 or more and then deletes the objects $O_A$, $O_C$, $O_E$ and $O_F$ as shown in the touch panel $10_{B62}$ after executing processing.

Further, when instruction input based on a user's operation of shaking the object processing device 1 with the shaking time period of 4 seconds or more is detected by the detection unit 12, the execution unit executes processing of deleting non-selected objects whose inter-object distance from the object $O_D$ is 0 or more (see FIG. 13($c$)). Specifically, the execution unit 13 refers to the table of FIG. 13($b$) and recognizes the objects $O_A$, $O_B$, $O_C$, $O_E$ and $O_F$ whose inter-object distance from the object $O_D$ is 0 or more and then deletes the objects $O_A$, $O_B$, $O_C$, $O_E$ and $O_F$ as shown in the touch panel $10_{B63}$ after executing processing.

Figure 15:
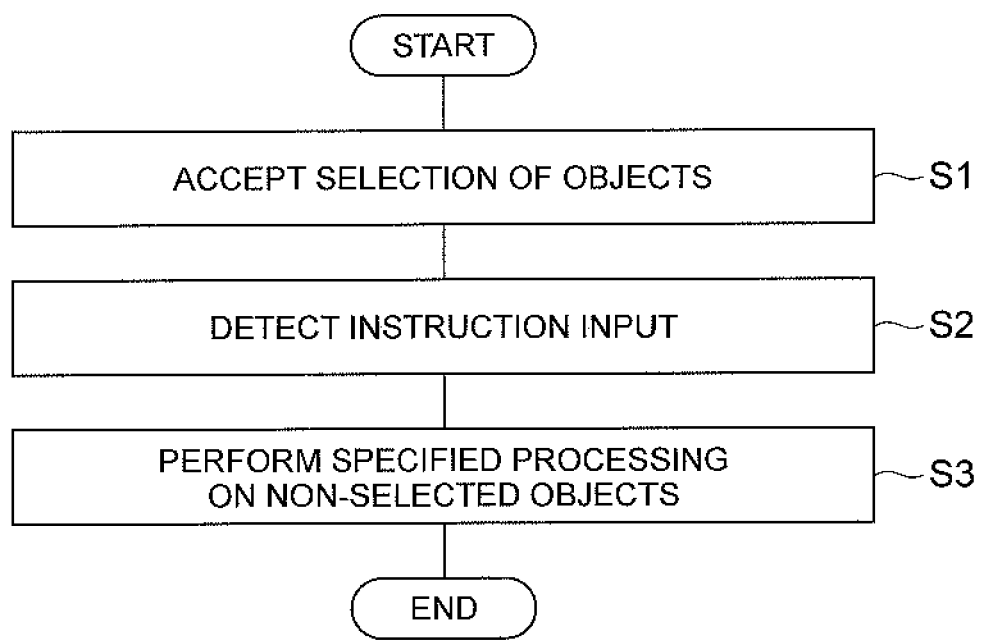
FIG. 15 is a flowchart showing an example of processing of an object processing method.

An object processing method in the object processing device 1 according to this embodiment is described hereinafter with reference to FIG. 15. FIG. 15 is a flowchart showing an example of processing of the object processing method.

First, the selection accepting unit 11 accepts selection of one or more objects among a plurality of objects displayed on the display unit 10$b$ (S1). The objects selected in this step are recognized as selected objects, and the objects not selected in this step are recognized as non-selected objects.

Next, the detection unit 12 detects instruction input different from acceptance of selection in the selection accepting unit 11 (S2).

Then, the execution unit 13 executes specified processing corresponding to the instruction input detected by the detection unit 12 in Step S2 on the non-selected objects (S3). Note that, in Step S3, first processing may be executed on the non-selected objects, and second processing different from the first processing may be executed on the selected objects.

Figure 16:
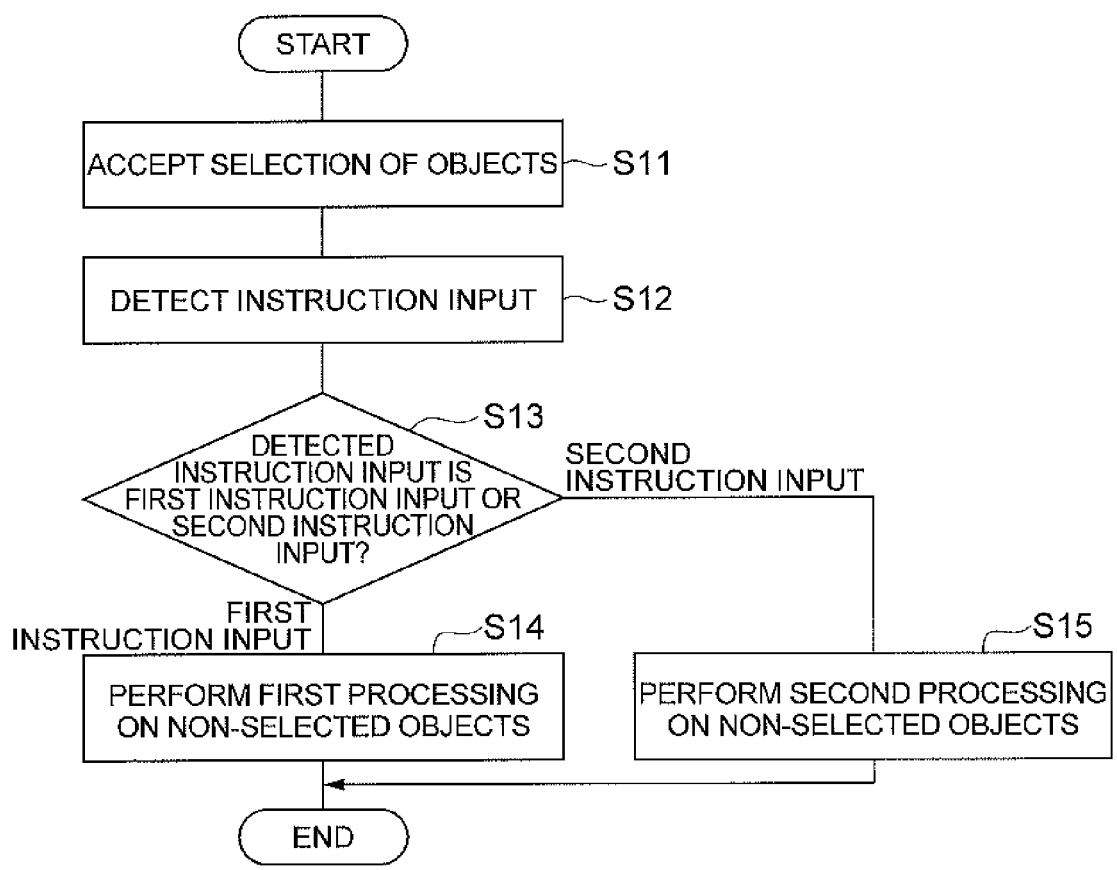
FIG. 16 is a flowchart showing another example of processing of an object processing method.

Another example of the object processing method in the object processing device 1 according to this embodiment is described hereinafter with reference to FIG. 16. FIG. 16 is a flowchart showing another example of processing of the object processing method.

First, the selection accepting unit 11 accepts selection of one or more objects among a plurality of objects displayed on the display unit 10b (S11). The objects selected in this step are recognized as selected objects, and the objects not selected in this step are recognized as non-selected objects.

Next, the detection unit 12 detects instruction input different from acceptance of selection in the selection accepting unit 11 (S12). In this example, the detection unit 12 can detect first instruction input and second instruction input different from the first instruction input as instruction input for processing on objects.

Then, the execution unit 13 determines the instruction input detected by the detection unit 12 corresponds to either one of the first instruction input and the second instruction input (S13). When the instruction input corresponds to the first instruction input, the process proceeds to Step S14. On the other hand, when the instruction input corresponds to the second instruction input, the process proceeds to Step S15.

In Step S14, the execution unit 13 executes the first processing corresponding to the first instruction input on the non-selected objects (S14). On the other hand, in Step S15, the execution unit 13 executes the second processing corresponding to the second instruction input on the non-selected objects (S15). Note that, in Step S15, the execution unit 13 may execute the second processing on the selected objects.

Figure 17:
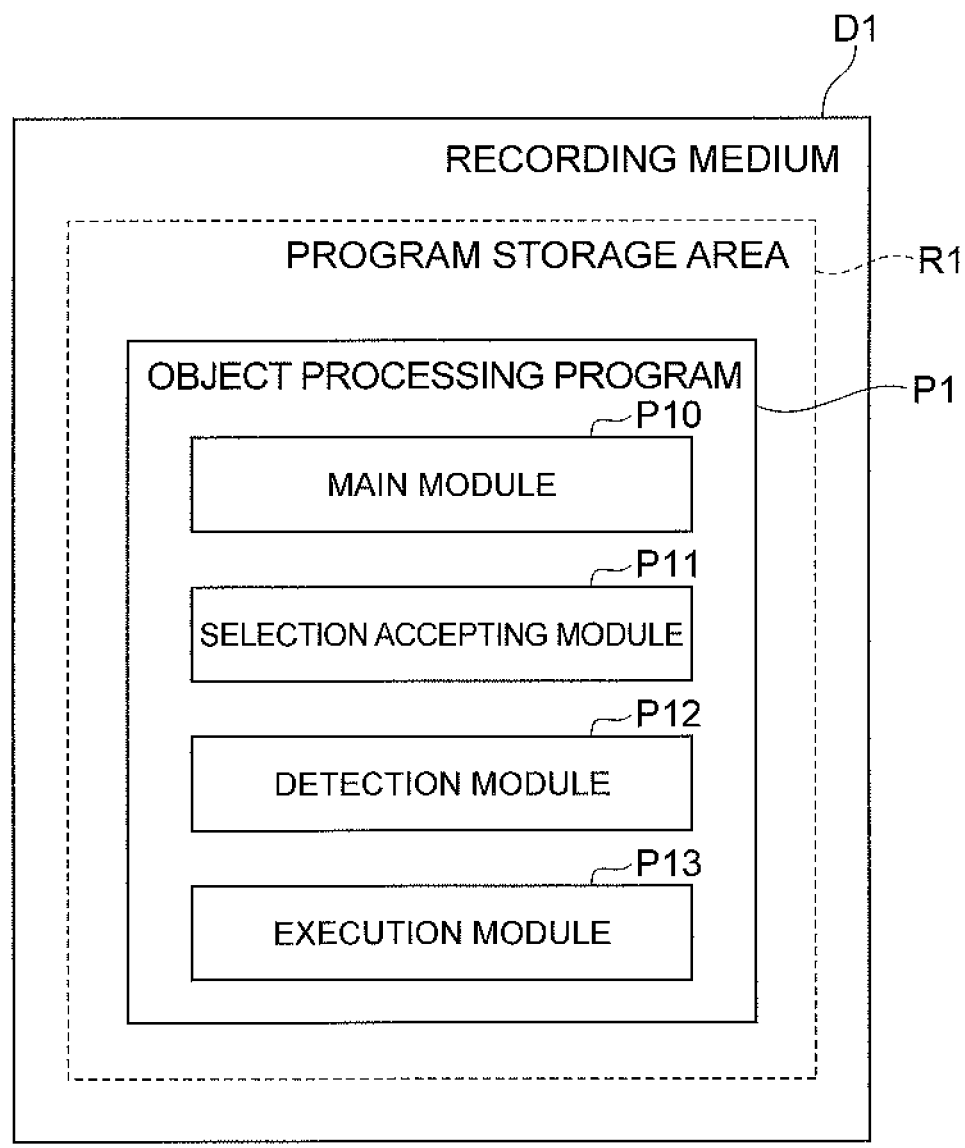
FIG. 17 is a diagram showing a configuration of an object processing program.

An object processing program that causes a computer to function as the object processing device 1 is described hereinafter with reference to FIG. 17. An object processing program P1 includes a main module P10, a selection accepting module P11, a detection module P12, and an execution module P13.

The main module P10 is a part that exercises control over the object processing. The functions implemented by executing the selection accepting module P11, the detection module P12, and the execution module P13 are equal to the functions of the selection accepting unit 11, the detection unit 12 and the execution unit 13 of the object processing device 1 shown in FIG. 1, respectively.

The object processing program P1 is provided through a storage medium such as CD-ROM or DVD-ROM or semiconductor memory, for example. Further, the object processing program P1 may be provided as a computer data signal superimposed onto a carrier wave over a communication network.

According to the object processing device 1, the object processing method and the object processing program P1 described above, selection of one or more objects among a plurality of displayed objects is accepted, and further instruction input is detected, and thereby processing on objects that are not selected is executed. It is thereby possible to easily set many objects as objects to be processed. Further, because processing on objects is executed by instruction input different from selection of objects, such as selection of objects displayed on the display unit 10b, for example, it is possible to reduce work for executing specified processing on objects to be processed.

Hereinbefore, the present invention has been described in detail with respect to the embodiment thereof. However, the present invention is not limited to the above-described embodiment. Various changes and modifications may be made therein without departing from the scope of the invention.

INDUSTRIAL APPLICABILITY

According to the embodiment, it is possible to reduce work for executing desired processing on objects to be processed displayed on a touch panel.

REFERENCE SIGNS LIST

1 . . . object processing device, 10 . . . touch panel, 10a . . . input unit, 10b . . . display unit, 11 . . . selection accepting unit, 12 . . . detection unit, 13 . . . execution unit, 14 . . . storage unit, D1 . . . recording medium, P1 . . . object processing program, P10 . . . main module, P11 . . . selection accepting module, P12 . . . instruction input module, P13 . . . execution module, $O_S$ . . . selected object, $O_U$ . . . non-selected object

The invention claimed is:

1. An object processing device comprising:
a display unit configured to display an image containing a plurality of objects;
an input unit configured to detect input from a user indicating a position on the display unit and formed integrally with the display unit;
a selection receiving unit configured to receive selection input of one or more objects displayed on the display unit based on input detected by the input unit;
at least one memory operable to store program code; and
at least one processor operable to read the program code and operate as instructed by the program code, the program code comprising:
detection code that causes the at least one processor to detect instruction input different from selection input of objects by the selection receiving unit; and
execution code that causes the at least one processor to, when instruction input detected by the detection code is a specified instruction input, execute specified processing corresponding to the specified instruction input only on non-selected objects being objects other than the object of which selection input is performed by the user among the plurality of objects displayed by the display unit.

2. The object processing device according to claim 1, wherein
the detection code is further configured to cause the at least one processor to detect an event including a direction parameter with respect to a state of the object processing device, and detect an event having a specified direction parameter as the instruction input.

3. The object processing device according to claim 2, wherein
the detection code is further configured to cause the at least one processor to detect a detected value from a gyro sensor included in the object processing device, and detect a specified detected value as the instruction input.

4. The object processing device according to claim 2, wherein
the detection code is further configured to cause the at least one processor to detect a detected value from an acceleration sensor included in the object processing device, and detect a specified detected value as the instruction input.

5. The object processing device according to claim 1, wherein the detection code is further configured to cause the at least one processor to detect an event including direction and size parameters with respect to a state of the object processing device, and detect an event having specified direction and size parameters as the instruction input.

6. The object processing device according to claim 1, wherein the detection code is further configured to cause the at least one processor to detect a time period when a specified operation is performed on the object processing device, and detect a specified operating time period related to the operation as the instruction input.

7. The object processing device according to claim 1, wherein
the detection code is further configured to cause the at least one processor to detect a user's voice, and detect a specified keyword included in the voice as the instruction input.

8. The object processing device according to claim 1, wherein the detection code is further configured to cause the at least one processor to detect specified input by a user detected by the input unit as the instruction input.

9. The object processing device according to claim 1, wherein the specified processing corresponding to the specified instruction input comprises one among processing of randomly changing positions of the non-selected objects on the display unit, processing of deleting the non-selected objects, and processing of moving the non-selected objects to another page different from a page where the non-selected objects are displayed.

10. The object processing device according to claims 1, wherein
the execution code is further configured to cause the at least one processor to execute first processing on the non-selected objects and execute second processing different from the first processing on selected objects being objects selected by the selection receiving unit.

11. The object processing device according to claim 10, wherein the specified processing corresponding to the specified instruction input comprises one among processing of randomly changing positions of the objects to be processed on the display unit, processing of deleting the objects to be processed, and processing of moving the objects to be processed to another page different from a page where the objects are displayed.

12. The object processing device according to claim 1, wherein
the detection code is further configured to cause the at least one processor to detect first instruction input and second instruction input different from the first instruction input as instruction input for processing on objects, and
the execution code is further configured to cause the at least one processor to execute, when the first instruction input is detected by the detection unit, first processing on the non-selected objects, and execute, when the second instruction input is detected by the detection unit, second processing different from the first processing on selected objects being objects selected by the selection accepting unit.

13. The object processing device according to claim 1, wherein
the program code further comprises calculation code to calculate an inter-object distance indicating a degree of similarity of attributes for each pair of objects based on a degree of similarity between each pair of objects,
the detection code is further configured to cause the at least one processor to detect instruction input with an input value of a certain level as instruction input for processing on objects, and
the execution code is further configured to cause the at least one processor to execute specified processing on a non-selected object where the inter-object distance from a selected object being an object selected by the selection accepting unit corresponds to an inter-object distance associated in advance with the input value accompanying the instruction input.

14. An object processing device comprising:
a display unit configured to display an image containing a plurality of objects;
an input unit configured to detect input from a user indicating a position on the display unit and formed integrally with the display unit;
a selection receiving unit configured to receive selection input of one or more objects displayed on the display unit based on input detected by the input unit;
at least one memory operable to store program code; and
at least one processor operable to read the program code and operate as instructed by the program code, the program code comprising:
detection code that causes the at least one processor to detect instruction input different from selection input of objects by the selection receiving unit; and
execution code that causes the at least one processor to, when instruction input detected by the detection code is a specified instruction input, execute specified processing corresponding to the specified instruction input only on non-selected objects being objects other than the object of which selection input is performed by the user among the plurality of objects displayed by the display unit, wherein
the detection code is further configured to cause the at least one processor to detect first instruction input and second instruction input different from the first instruction input as instruction input for processing on objects, and
the execution code is further configured to cause the at least one processor to execute, when the first instruction input is detected by the detection unit, first processing on the non-selected objects, and execute, when the second instruction input is detected by the detection unit, second processing different from the first processing on the non-selected objects.

15. The object processing device according to claim 14, wherein
the detection code is further configured to cause the at least one processor to detect an event including a direction parameter with respect to a state of the object processing device, detect an event having a first direction parameter as the first instruction input, and detect an event having a second direction parameter different from the first direction as the second instruction input.

16. The object processing device according to claim 11, wherein
the detection code is further configured to cause the at least one processor to detect a time period when a specified operation is performed on the object processing device, determine the detected operation as the first instruction input when the detected operating time period corresponds to a preset first time range, and determine the detected operation as the second instruction input when the detected operating time period corresponds to a preset second time range.

17. An object processing method performed by an object processing device including a display unit configured to display an image containing a plurality of objects, an input unit configured to be able to detect input from a user indicating a position on the display unit and formed integrally with the display unit, and a selection receiving unit configured to receive selection input of one or more objects displayed on the display unit based on input detected by the input unit, the method comprising:

- a detection step of detecting instruction input different from selection input of objects by the selection receiving unit; and
- an execution step of, when instruction input detected in the detection step is a specified instruction input, executing specified processing corresponding to the specified instruction input only on non-selected objects being objects other than the object of which selection input is performed by the user among the plurality of objects displayed by the display unit.

* * * * *